(12) United States Patent
Racunas et al.

(10) Patent No.: US 7,954,038 B2
(45) Date of Patent: May 31, 2011

(54) FAULT DETECTION

(75) Inventors: Paul Racunas, Marlborough, MA (US);
Srilatha Manne, Seattle, WA (US);
Kypros Constantinides, Ann Arbor, MI (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 11/648,853

(22) Filed: Dec. 29, 2006

(65) Prior Publication Data

US 2008/0163010 A1 Jul. 3, 2008

(51) Int. Cl.
*G11C 29/00* (2006.01)
(52) U.S. Cl. ...................................... 714/763; 714/758
(58) Field of Classification Search .................. 714/763, 714/758
See application file for complete search history.

(56) References Cited

U.S. PATENT DOCUMENTS

| | | | | |
|---|---|---|---|---|
| 2005/0050294 | A1* | 3/2005 | Horn et al. | 711/203 |
| 2006/0126640 | A1* | 6/2006 | Sood et al. | 370/395.32 |
| 2007/0294235 | A1* | 12/2007 | Millett | 707/3 |
| 2008/0065821 | A1* | 3/2008 | Robotham | 711/108 |

OTHER PUBLICATIONS

Armstrong, David N., et al., "Wrong Path Events: Exploiting Unusual and Illegal Program Behavior for Early Misprediction Detection and Recovery", 1-10 Pgs.
Bloom, Burton H., "Space/Time Trade-offs in Hash Coding with Allowable Errors", *Communications of the ACM*; vol. 13: No. 7, (Jul. 1970), 422-426 Pgs.
Hangal, Sudheendra, et al., "Tracking Down Software Bugs Using Automatic Anomaly Detection", 11 Pgs.
Patel, Sanjay J., et al., "A Processor-Level Framework for High-Performance and High-Dependability", 5 Pgs.
Wang, Nicholas J., et al., "ReStore: Symptom Based Soft Error Detection in Microprocessors", 10 Pgs.
Weaver, Christopher, et al., "Techniques to Reduce the Soft Error Rate of a High-Performance Microprocessor", *31st Annual International Symposium on Computer Architecture (ISCA)*, (Jun. 2004), 1-12 Pgs.

\* cited by examiner

*Primary Examiner* — Guy J Lamarre
(74) *Attorney, Agent, or Firm* — Caven & Aghevli LLC (57) ABSTRACT

Methods and apparatus to efficiently detect faults are described. In an embodiment, an encoded value may be generated based on a portion of an instruction address and a portion of a corresponding result value. The encoded value may be used to determine whether an entry corresponding to the encoded value is absent from a screening storage unit. Other embodiments are also described.

30 Claims, 6 Drawing Sheets

FAULT DETECTION

BACKGROUND

The present disclosure generally relates to the field of electronics. More particularly, an embodiment of the invention relates to techniques for detecting faults that may occur during operation of an integrated circuit device such as a processor.

As integrated circuit (IC) fabrication technology improves, manufacturers are able to integrate additional functionality onto a silicon substrate. As the number of these functionalities increases, however, so does the number of components on an IC chip. Additional components add additional signal switching, in turn, generating more heat. The additional heat may damage an IC chip by, for example, thermal expansion. Also, the additional heat may limit usage locations and/or applications of a computing device that includes such chips.

To reduce such shortcomings (and possibly improve performance), some implementations may decrease the process size and/or the operating voltage of an IC chip. However, reduction in process size and voltage may make IC devices more susceptible to transient failures. In response, some processors may utilize various techniques for protection against transient errors, such as error correction code (ECC), redundant multithreading, or redundant circuitry. Implementing such solutions may however result in an increase in area, increase in power consumption, and/or increase in performance overheads that may render such solutions impractical.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" or "micro-operation" (which may also be referred to as "uop") herein may be interchangeable.

Some of the embodiments discussed herein may be utilized to detect faults that may occur during operation of an IC device such as a processor. In an embodiment, the faults may be the result of internal inconsistencies in application behavior that may be transient, such as radiation-induced soft errors—caused by neutrons in cosmic rays and/or alpha particles in packaging material. In an embodiment, upon detection (which may also be referred to herein as "screening") of an error or fault, a warning may be issued to flush a processor pipeline or perform a checkpoint recovery. Such embodiments may allow for discarding of incorrect data from a processor while the data is still in speculative state. Furthermore, as discussed herein, a "fault" may be defined as a departure from established behavior. For example, in one embodiment, probability-based fault screening may be utilized by reference to data stored in a storage device that indicates whether a combination of portions of a result value and the corresponding instruction address have been previously detected. Such techniques may allow for improved performance in various computing systems, such as the computing systems discussed with reference to FIGS. 1 and 5-6.

Figure 1:
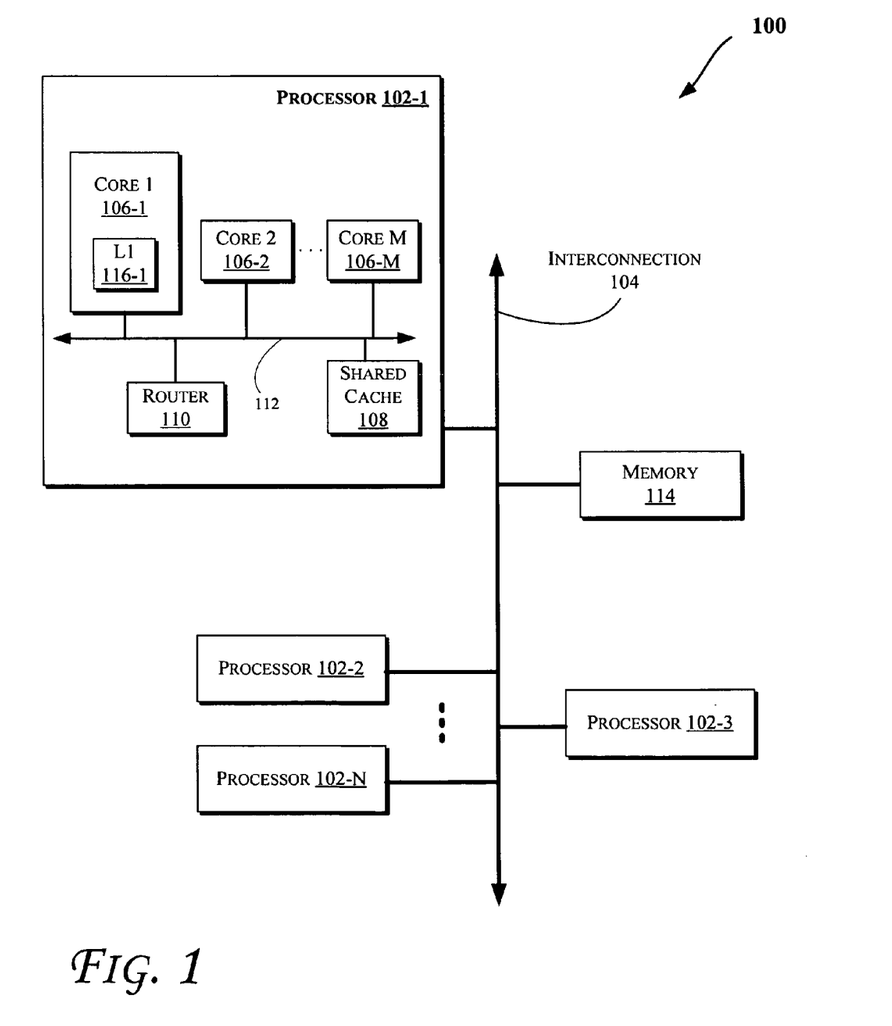
FIGS. 1, 5, and 6 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116").

Figure 2:
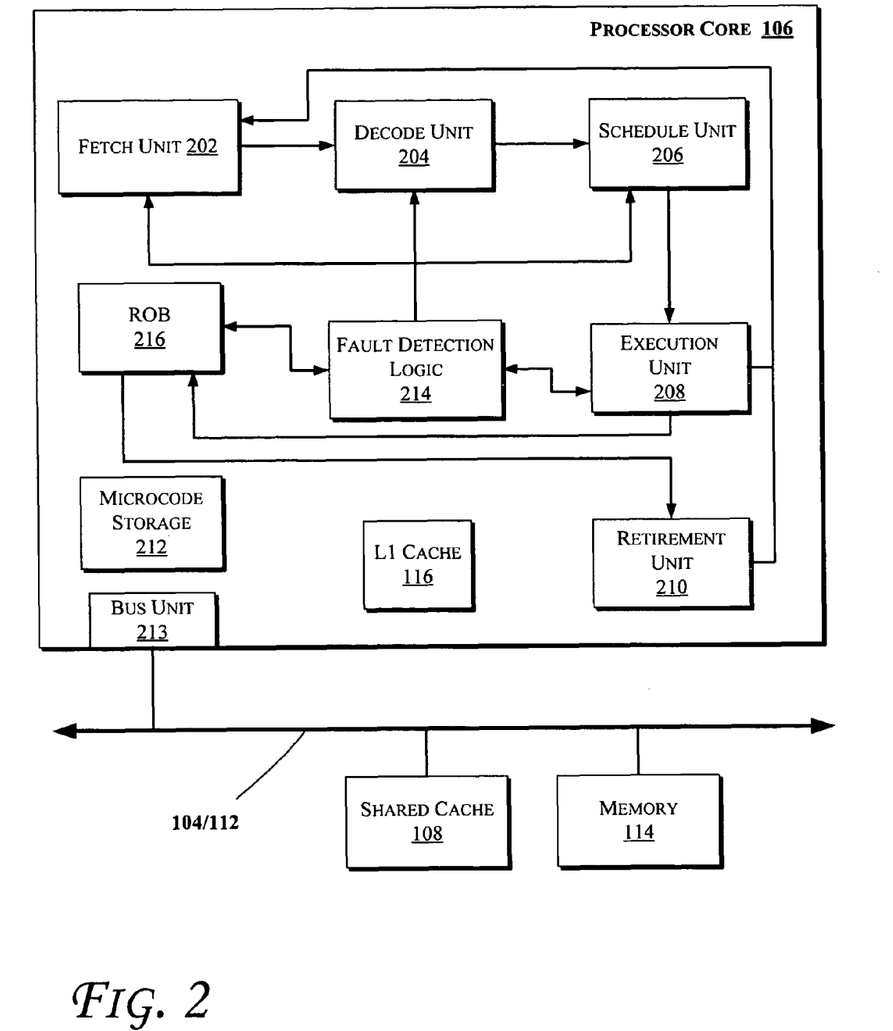
FIGS. 2 and 3 illustrate block diagrams of portions of a processor core and other components of a computing system, according to some embodiments of the invention.

FIG. 2 illustrates a block diagram of portions of a processor core 106 and other components of a computing system, according to an embodiment of the invention. In one embodiment, the arrows shown in FIG. 2 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 5 and 6. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may additionally include a storage unit 212 (which may be a microcode read-only memory (uROM) in an embodiment) to store microcode. The microcode stored in the storage unit 212 may be used to configure various hardware components of the core 106. In an embodiment, the microcode stored in the storage unit 212 may be loaded from another component in communication with the processor core 106, such as a computer-readable medium or other storage device discussed with reference to FIGS. 5 and 6. The core 106 may also include a bus unit 213 to allow communication between components of the processor core 106 and other components (such as the components discussed with reference to FIG. 1) via one or more buses (e.g., buses 104 and/or 112).

As shown in FIG. 2, the core 106 may also include a fault detection logic 216 to detect when a fault has occurred. The logic 216 may be provided in any location, such as within the execution unit 208 in various embodiments. In an embodiment, the detected faults may be the result of internal inconsistencies in application behavior that may be transient, such as radiation-induced soft errors that may be caused by neutrons in cosmic rays and/or alpha particles in packaging material. In an embodiment, upon detection of a fault by the logic 214, the logic 214 may generate a signal to cause the flushing of the processor core 106 pipeline (for example, as shown in FIG. 2, the logic 214 may provide a signal to one or more components of the core 106 such as components 202, 204, 206, 216, etc.). Furthermore, the logic 214 may generate a signal (which may be the same as the aforementioned signal that causes the flushing of the processor pipeline in an embodiment) to indicate to the fetch unit 202 that new instructions may need to be fetched (or a checkpoint recovery may need to be performed). Such embodiments may allow for discarding of incorrect data from a processor (such as the core 106) while the data is still in speculative state. As shown, the core 106 may further include a reorder buffer (ROB) 216 to store information about in-flight instructions (or uops) for access by various components of the processor core 106. For example, the logic 214 may read and/or modify data stored in the ROB 216 to detect faults and/or cause flushing of data associated with in-flight instructions (or uops). Further operations of the logic 214 are discussed herein with reference to FIGS. 3-4.

Figure 3:
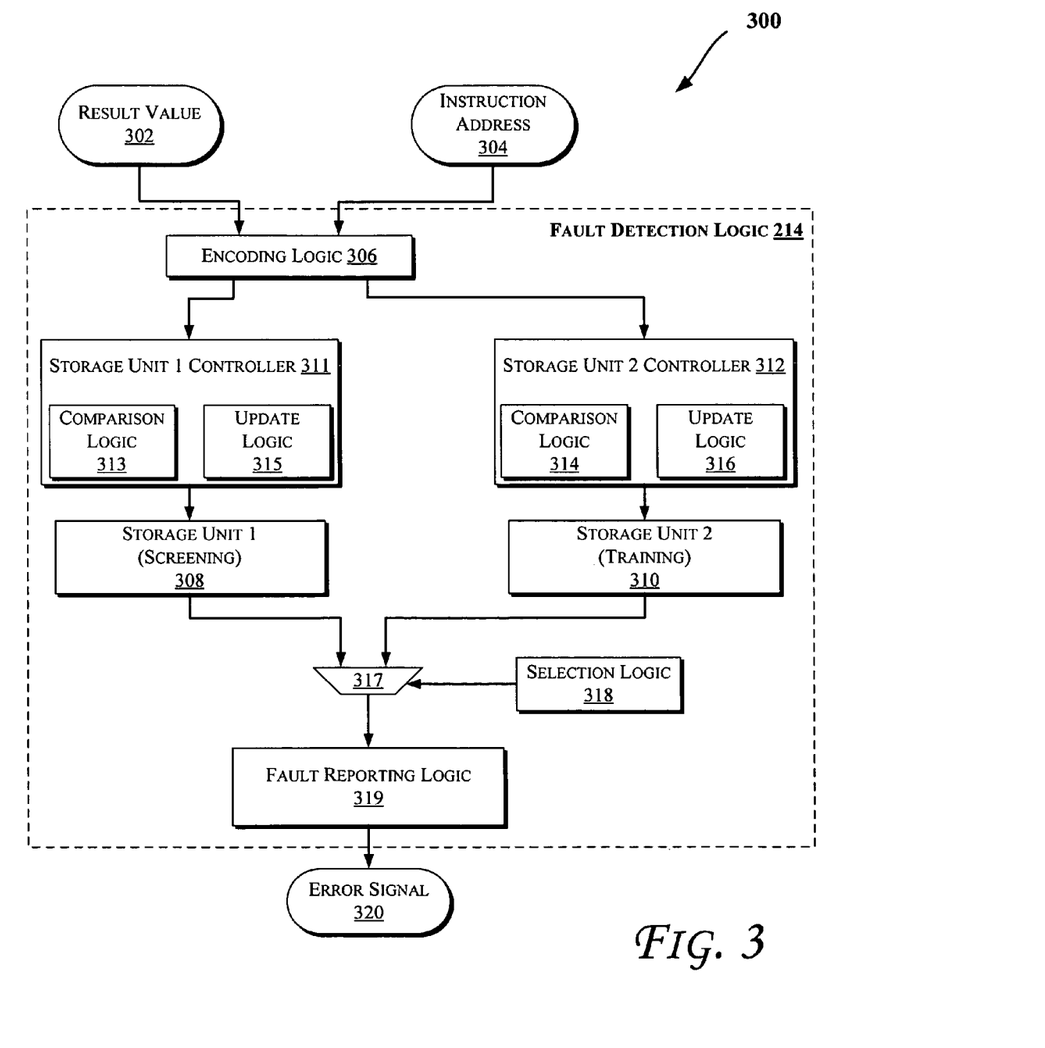

FIG. 3 illustrates a block diagram of portions of a processor core 300, according to an embodiment of the invention. In one embodiment, the arrows shown in FIG. 3 illustrate the flow direction of instructions and/or data through the core 300. In an embodiment, the core 300 may include the fault detection logic 214 of FIG. 2. As shown in FIG. 3, the logic 214 may receive an instruction result value 302 and the corresponding instruction address 304 via an encoding logic 306.

Moreover, the logic 306 may encode a portion of the result value 302 and a portion of the instruction address 304 to generate a corresponding encoded value. In an embodiment, the encoding logic 306 may include more than one encoding logic, such as, for example, one or more hash logics, each of which may access a designed portion of the storage units 308 and 310. Hence, in embodiments that include more than one encoding logic, the storage units 308 and 310 may be partitioned into more than one section, wherein each section corresponds to one of the encoding (or hashing) logics.

Additionally, in an embodiment, each encoding logic (or each of the one or more hash logics of the logic 306) may encode a different portion of the result value 302 and a different portion of the instruction address 304 to generate a plurality of encoded values. The encoded value(s) generated by the logic 306 may then be used as indices into storage units 308-310 (e.g. through controllers 311 and 312, respectively) to determine whether the same combination of instruction address and result has previously occurred. Storage units 308-310 may also indicate if the new combination of instruction address and result match a previously established pattern, such as the instruction address producing results with value locality or results that increase by a constant stride. For example, comparison logics 313 or 314 may utilize the encoded value(s) generated by the logic 306 to search (e.g. via indexing) the storage units 308 and 310 to determine whether corresponding entries are already stored in the storage units 308 or 310. In another example, if the low bits of the result value are ignored by the encoding logic 306, and the instruction at the specified address is producing results incrementing by 1, the encoding logic 306 may map several successive result values to the same screener entry in storage units 311 (or 312 depending on the implementation). This may reduce the number of false screener triggers. After comparison and generation of an output that indicates whether a corresponding entry existed in the storage units 308 or 310, the encoded value(s) generated by the logic 306 may be stored in the storage units 308 and 310, e.g., by the update logics 315 or 316, respectively, as will be further discussed with reference to FIG. 4.

As shown in FIG. 3, the fault detection logic 214 may include a multiplexer 317 that selects the output of one of the storage units 308 or 310, e.g., that may indicate whether the same combination or encoding of instruction address and instruction result has occurred previously. In embodiments that utilize a plurality of hash functions within the logic 306, the result of the comparisons may be logically combined via an AND gate (not shown) such that a single signal indicates whether all hashes resulted in a match.

Furthermore, the multiplexer 317 may select one of its inputs based on a selection signal provided by the selection logic 318 for output to a fault reporting logic 319. The selection logic 318 may select the output of one of the storage units 308 or 310 based various determinations. In one embodiment, the logic 318 may switch between the storage units 308 and 310 on a periodic basis. Also, the logic 318 may switch between the storage units 308 and 310 based on data stored in the units 308 or 310. For example, when one of the storage units is storing more ones than the other storage unit (e.g., indicating that the storage unit with more ones has become saturated or stale), the selection logic 318 may select the other storage unit to generate the output of the multiplexer 317.

The fault reporting logic 319 may determine whether the output signal of the multiplexer 317 indicates the occurrence of an error or fault and in response cause the generation of an error or fault signal 320 that may cause occurrence of a pipeline flush, checkpoint recover, fetching of new instructions, etc., such as discussed herein, e.g., with reference to FIG. 2. Accordingly, the output of one of the storage units 308 or 310 may be utilized at any one time to generate the signal 320. Hence, FIG. 3 indicates that the storage unit 308 may be a "screening" storage unit, e.g., selected by the logic 318 for communication with the logic 319, whereas the storage unit 310 may be a "training" storage unit, e.g., not selected by the logic 318. The labels "screening" and "training" are merely shown to illustrate one example and other configurations may also be possible. Further, more than two storage units (308-310) may be utilized in some embodiments. Additionally, in various embodiments, storage units 308 and 310 may be implemented as separate hardware storage devices or may be alternatively logical divisions within a single storage device such as the L I cache 116 or other memory devices discussed herein. Also, the logic 319 may generate more than one signal, for example, to selectively indicate to various components of the core 106 of FIG. 2 that a fault has occurred.

Figure 4:
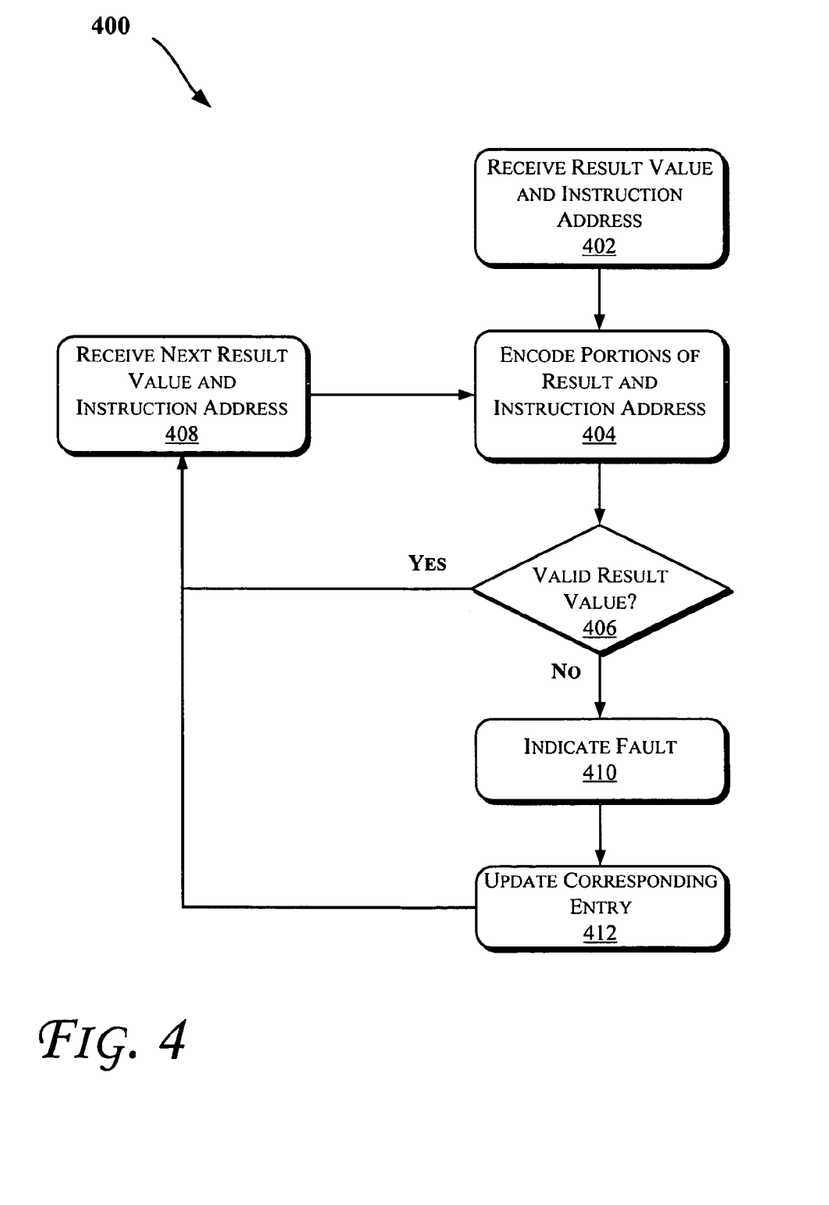
FIG. 4 illustrates a flow diagram of a method in accordance with an embodiment of the invention.

FIG. 4 illustrates a flow diagram of a method 400 to detect occurrence of a fault, according to an embodiment of the invention. In some embodiments, various components discussed with reference to FIGS. 1-3 and 5-6 may be utilized to perform one or more of the operations discussed with reference to FIG. 4.

Referring to FIGS. 1-4, at an operation 402, a result value and instruction address are received. For example, the logic 306 may receive the value 302 and address 304 at operation 402. At an operation 404, one or more portions of the result value and instruction address may be encoded (e.g., such as discussed with reference to FIG. 3). At an operation 406, the encoded value(s) of operation 404 may be used to determine whether a valid result value is present. For example, at operation 406, the comparison logics 313 or 314 may determine whether the newly generated encoded value(s) have a corresponding entry in the storage units 308 or 310. If a valid result exists at operation 406 (e.g., no corresponding entry is present in the storage units 308 or 310), an operation 408 may receive a next result value and instruction address and the method 400 may resume with the operation 404.

If a valid result is absent at operation 406, a fault may be indicated at an operation 410 (e.g., by generating the error signal 320 such as discussed with reference to FIG. 3). At an operation 412, corresponding entries may be updated (e.g., the update logics 315 or 316 may add one or more entries in the storage units 308 and 310 that correspond to the encoded value(s) generated at operation 404). After operation 410, the method 400 continues with operation 408.

In some embodiments, it is also possible that some information other than result value and instruction address may be used as an input to the encoding logic 306 at operation 404. For example, various information may be received at operation 402 and subsequently utilized at other operations of method 400, such as branch history, last result value that the instruction address generated, etc.

Figure 5:
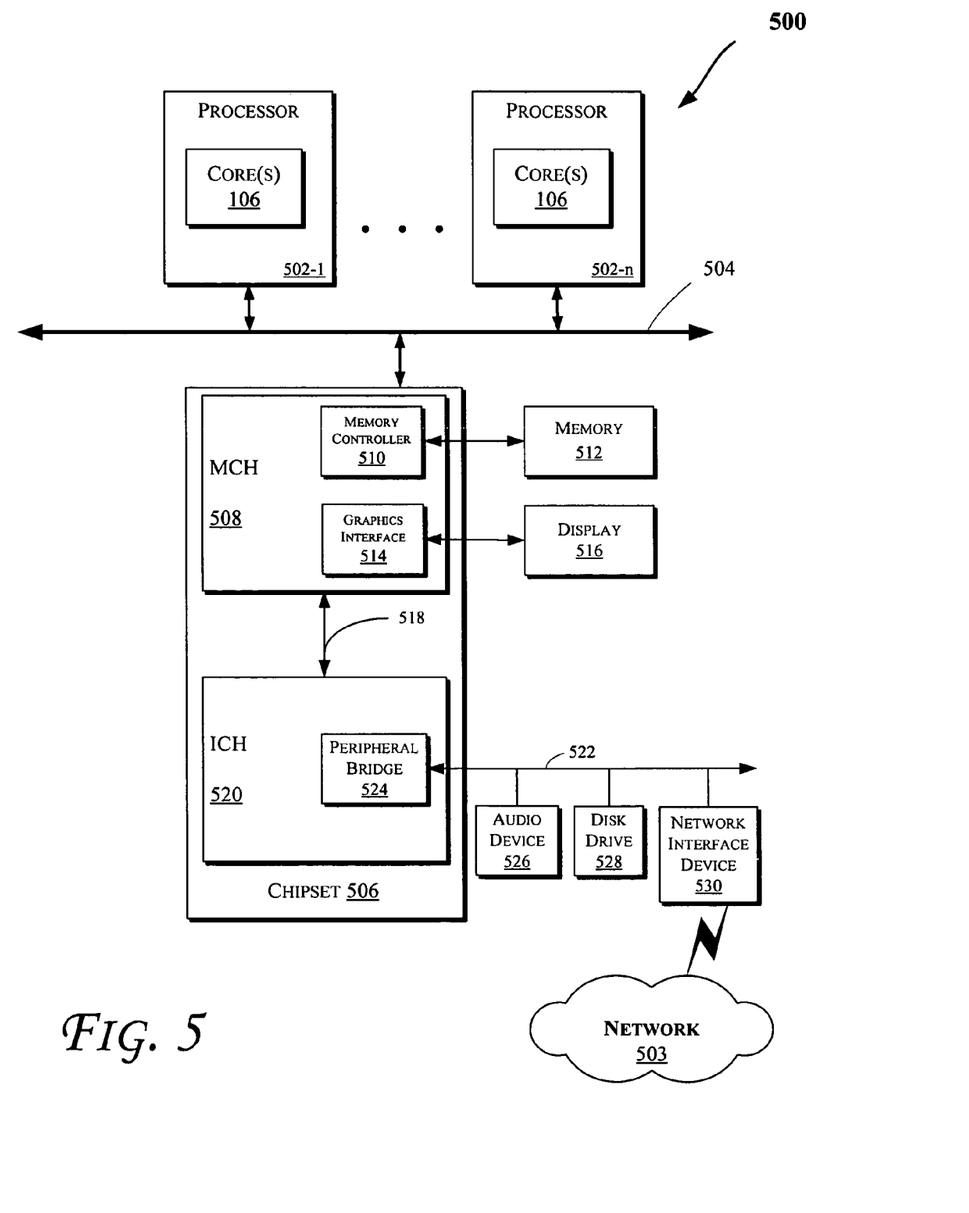

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the cores 106. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, a graphics accelerator may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
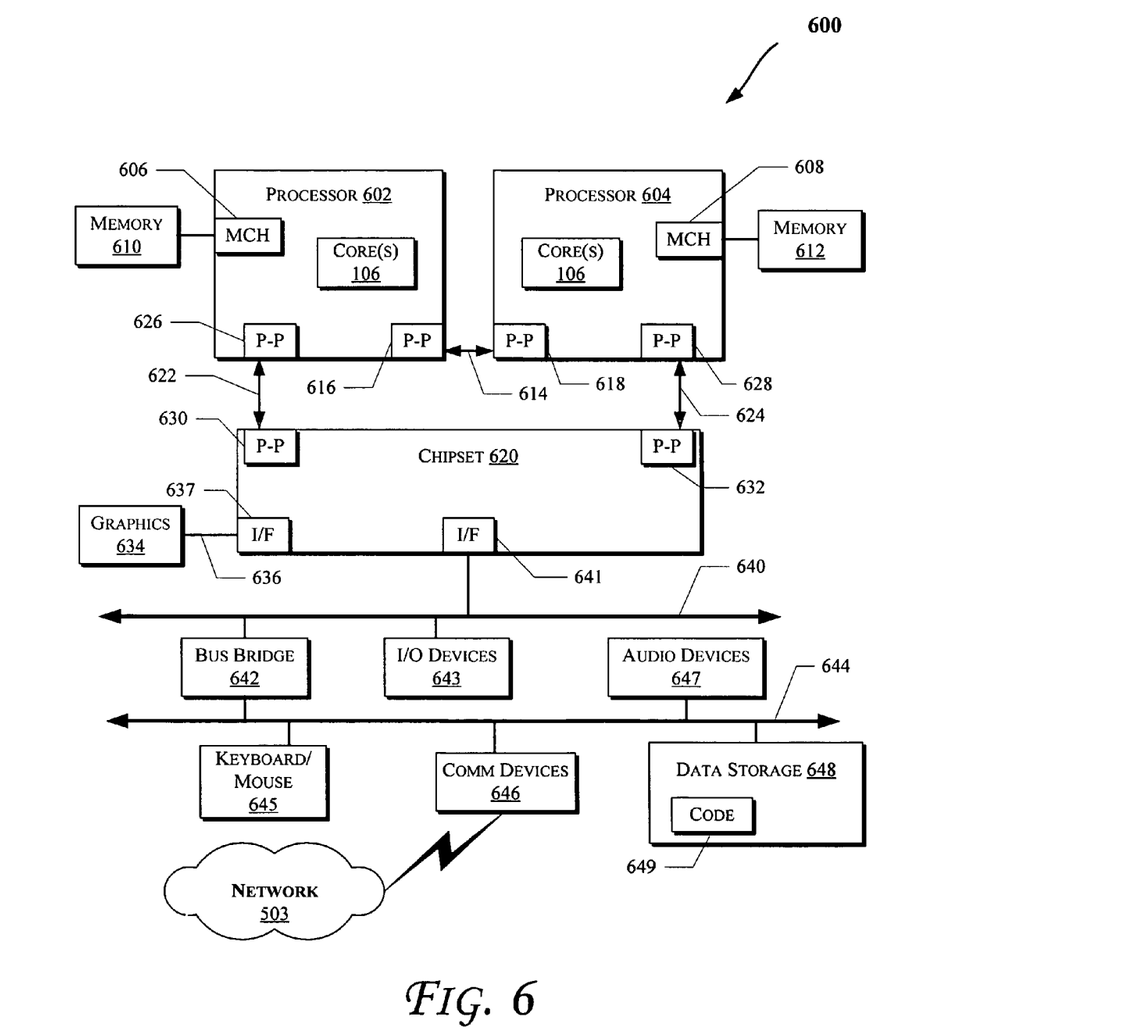

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIGS. 1-2 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
   a first logic to generate a first value based on a portion of an instruction address and a portion of a corresponding result value, wherein the result value is to be generated based on execution of an instruction; and
   a second logic to generate an error signal in response to a detection that an entry corresponding to the first value is absent from a screening storage unit.

2. The processor of claim 1, wherein the first logic hashes the portion of the result value and the instruction address to generate the first value.

3. The processor of claim 1, further comprising an execution unit to execute an instruction having the instruction address to generate the result value.

4. The processor of claim 1, wherein the generation of the error signal causes performance of one or more of a processor pipeline flush, a checkpoint recovery, or a instruction fetch.

5. The processor of claim 1, further comprising a third logic to select one of a first storage unit and a second storage unit as the screening storage unit.

6. The processor of claim 5, wherein the third logic switches between the first and second storage units on a periodic basis.

7. The processor of claim 5, wherein the third logic selects one of the first or second storage units as the screening storage unit based on data stored in at least one of the first or second storage units.

8. The processor of claim 1, further comprising a third logic to generate a second value based on a different portion of the result value and instruction address.

9. The processor of claim 8, further comprising a fourth logic to logically AND the first value and the second value to generate a third value.

10. The processor of claim 9, wherein the second logic is to generate the error signal in response to a detection that an entry corresponding to the third value is absent from the screening storage unit.

11. The processor of claim 1, wherein the first logic comprises a plurality of encoding logics to encode different portions of the result value and instruction address to generate a plurality of values.

12. The processor of claim 1, further comprising a plurality of processor cores, wherein at least one of the plurality of processor cores comprises one or more of the first logic, the second logic, or the screening storage unit.

13. The processor of claim 1, wherein one or more of the first logic, the second logic, the screening storage unit, or a plurality of processor cores are on a same integrated circuit chip.

14. A method comprising:
executing an instruction to generate a result value;
encoding a portion of the result value and a portion of an address of the instruction to generate a first value; and
generating a fault indication signal in response to detecting that an entry corresponding to the first value is absent from a screening storage unit.

15. The method of claim 14, further comprising performing one or more operations in response to the fault signal, wherein the one or more operations comprise one or more of: a processor pipeline flush operation, a checkpoint recovery operation, or a instruction fetch operation.

16. The method of claim 14, further comprising encoding a plurality of different portions of the result value and different portions of the instruction address to generate a plurality of encoded values.

17. The method of claim 14, further comprising searching the screening storage unit in accordance with the first value to determine whether one or more entries stored in the screening storage unit correspond to the first value.

18. The method of claim 14, further comprising updating the screening storage unit in accordance with the first value.

19. The method of claim 14, wherein encoding the portion of the result value and the portion of the instruction comprises hashing the portion of the result value and the portion of the instruction address.

20. A computing system comprising:
a memory to store an instruction;
a processor to fetch the instruction from the memory and execute it to generate a result value, the processor to comprise:
an encoding logic to generate an encoded value based on a portion of an address of the instruction and a portion of the result value; and
a comparison logic to detect that an entry corresponding to the encoded value is absent from a screening storage unit and cause generation of an error signal.

21. The system of claim 20, further comprising a fault reporting logic to generate the error signal.

22. The system of claim 20, wherein the encoding logic hashes the portion of the result value and the instruction address to generate the encoded value.

23. The system of claim 20, wherein the generation of the error signal causes performance of one or more of a processor pipeline flush, a checkpoint recovery, or a instruction fetch.

24. The system of claim 20, further comprising a selection logic to select one of a first storage unit and a second storage unit as the screening storage unit.

25. The system of claim 24, wherein the selection logic switches between the first and second storage units on a periodic basis.

26. The system of claim 20, wherein the screening storage unit comprises a plurality of partitions, wherein each of the plurality of partitions corresponds to one of a plurality of encoding logics.

27. The system of claim 20, wherein the processor comprises a plurality of processor cores, wherein at least one of the plurality of processor cores comprises one or more of the encoding logic, the comparison logic, or the screening storage unit.

28. The system of claim 20, wherein one or more of the encoding logic, the comparison logic, the screening storage unit, or the processor are on a same integrated circuit chip.

29. The system of claim 20, further comprising a level 1 cache that comprises the screening storage unit.

30. The system of claim 20, further comprising an audio device coupled to the processor.

* * * * *